G. P. FULLER.
LAMP.
No. 105,063.  Patented July 5, 1870.
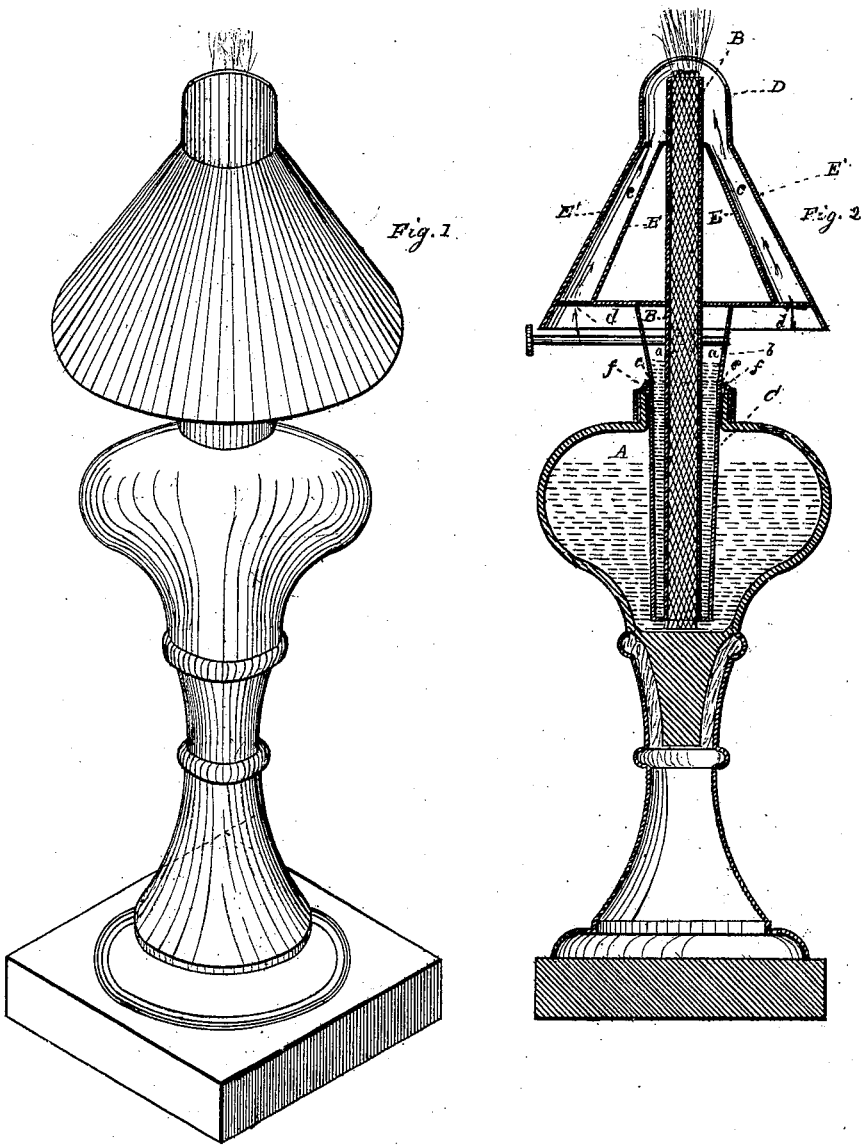

United States Patent Office.

GEORGE P. FULLER, OF HUMPHREY, NEW YORK.

Letters Patent No. 105,063, dated July 5, 1870.

IMPROVEMENT IN LAMPS.

The Schedule referred to in these Letters Patent and making part of the same.

I, GEORGE P. FULLER, of Humphrey, Cataraugus county, and State of New York, have invented certain Improvements in Kerosene Lamps, of which the following is a specification.

The nature of my invention consists of a lamp having a wick-tube, and tube around the same, forming a space for holding water to keep said wick-tube cool, combined and arranged with the oil-chamber and burner, and an annular conical passage above said chamber for supplying the burner with air, as hereinafter described.

To enable others skilled in the art to which my improvement appertains to make and use my invention, I will now give a detailed description thereof.

In the accompanying drawing, which makes a part of this specification—

Figure 1 is an isometrical view of the improved lamp.

Figure 2 is a vertical section of the same.

Like letters in both figures indicate the same parts.

A is the oil-chamber;

B, the wick-tube; and

C, a tube which surrounds the latter, forming an annular space, $a$, which is filled with water for keeping the wick-tube cool, and thereby preventing any communication of gas from the oil-chamber to the flame, and thus effectually preventing explosion.

There is an opening, $b$, at the upper end of the tube C, for supplying the space $a$ with water. The opening may be closed, if desired, by means of a screw-plug or other device.

D is the burner.

E and E' are inner and outer cones, between which is an annular air-passage, $c$, through which air is supplied to the flame F, there being openings $d$ in the bottom-plate G, for the passage of the air into said annular space.

The air being concentrated at the flame by means of said conical passage $c$, a more perfect combustion and clearer light are obtained.

There is a male screw, $e$, on the upper end of the tube C, which connects with the female screw $f$ in the neck $g$ of the lamp.

It will readily be seen that by the use of this device, which effectually cuts off all communication with the gas in the oil-chamber, explosions are completely prevented.

The device may be used either with a burner, as represented in the drawing, or with one adapted to the use of a chimney, in which latter case the burner must be adapted to the stationary wick-tube. It may be used with any ordinary lamp, and, on account of its simplicity and cheapness of construction, may be brought into very general use, whereas other devices are so complicated, or cost so much, as to become impracticable.

What I claim as my invention, and desire to secure by Letters Patent, is—

The combination of the oil-chamber A, tubes B and C, the latter having an opening, $b$, cones E and E', and perforated plate G, all arranged and operating substantially in the manner, and for the purpose set forth.

In testimony that the above is my invention, I have hereunto set my hand and affixed my seal this 30th day of November, 1869.

GEORGE P. FULLER. [L. S.]

Witnesses:
STEPHEN USTICK,
THOMAS J. BEWLEY.